(12) United States Patent
Hwang et al.

(10) Patent No.: US 9,631,248 B2
(45) Date of Patent: Apr. 25, 2017

(54) HEATING FURNACE SYSTEM FOR HOT STAMPING

(75) Inventors: Jung Bok Hwang, Pyeongtaek-si (KR); Sun Ung Kim, Gyeongju-si (KR); Won Hyuck Kim, Ulsan (KR); Seung Jo Yoo, Gyeongju-si (KR); Hyun Woo Lee, Daegu (KR)

(73) Assignee: MS Autotech Co., Ltd., Gyeongsangbuk-do (KR)

( * ) Notice: Subject to any disclaimer, the term of this patent is extended or adjusted under 35 U.S.C. 154(b) by 1337 days.

(21) Appl. No.: 12/496,254

(22) Filed: Jul. 1, 2009

(65) Prior Publication Data
US 2010/0086002 A1    Apr. 8, 2010

(30) Foreign Application Priority Data
Oct. 2, 2008    (KR) .................. 10-2008-0096912

(51) Int. Cl.
| H05B 6/10 | (2006.01) |
| H05B 6/16 | (2006.01) |
| C21D 1/42 | (2006.01) |
| C21D 8/02 | (2006.01) |
| C21D 9/46 | (2006.01) |
| F27B 9/10 | (2006.01) |

(Continued)

(52) U.S. Cl.
CPC .............. *C21D 1/42* (2013.01); *C21D 8/0205* (2013.01); *C21D 9/46* (2013.01); *F27B 9/10* (2013.01); *F27B 9/2407* (2013.01); *F27B 9/36* (2013.01); *F27D 99/0006* (2013.01); *F27D 2099/0061* (2013.01); *Y02P 10/253* (2015.11)

(58) Field of Classification Search
CPC .......... C21D 1/42; C21D 8/0285; C21D 9/46; F27B 9/2407; F27B 9/36; F27B 9/10; F27D 99/0006; F27D 2099/0061; H05B 6/365; H05B 6/104; H05B 6/40; H05B 6/06; H05B 6/02; H05B 6/36; H05B 6/24; H05B 6/362; H05B 6/44; H05B 6/103; H05B 6/102; H05B 6/101
USPC ....... 219/653, 645, 646, 655, 656, 665, 600, 219/647, 654, 483, 486; 373/7; 266/78, 266/104, 129
See application file for complete search history.

(56) References Cited

U.S. PATENT DOCUMENTS 4,117,293 A * 9/1978 Wicker et al. ................ 219/646
4,315,124 A * 2/1982 Granstrom et al. .......... 219/656
(Continued)

FOREIGN PATENT DOCUMENTS

GB          1 490 535          11/1977

*Primary Examiner* — Hung D Nguyen
(74) *Attorney, Agent, or Firm* — The Webb Law Firm

(57) ABSTRACT

In a heating furnace system for hot stamping, a first heating furnace has a plurality of pairs of upper and lower rolls arranged in a lengthwise direction thereof in order to transfer a steel plate, and high-frequency coils alternately arranged with the pairs of upper and lower rolls in the lengthwise direction thereof. A second heating furnace continuously transfers the steel plate from the first heating furnace during heating the steel plate at temperature of $A_{c3}$ or more, and has a plurality of transfer rollers arranged in a lengthwise direction thereof. The second heating furnace includes an electric furnace or a gas furnace. This heating furnace system can reduce space required for facilities by 50% or more compared to the related art.

5 Claims, 5 Drawing Sheets

(51) Int. Cl.
  *F27B 9/24*    (2006.01)
  *F27B 9/36*    (2006.01)
  *F27D 99/00*   (2010.01)

(56) References Cited

U.S. PATENT DOCUMENTS

| | | | |
|---|---|---|---|
| 4,373,364 A * | 2/1983 | Tanimoto | C21D 9/0081 |
| | | | 266/87 |
| 4,500,287 A * | 2/1985 | Carraroli et al. | 432/246 |
| 5,487,795 A * | 1/1996 | Kim et al. | 219/656 |
| 5,922,234 A * | 7/1999 | Grow et al. | 219/645 |
| 5,923,699 A * | 7/1999 | Swanger | 373/140 |
| 6,259,071 B1 * | 7/2001 | Demidovitch | G05D 23/1902 |
| | | | 219/483 |
| 6,460,690 B1 * | 10/2002 | Tachibana et al. | 198/791 |
| 2007/0116591 A1 * | 5/2007 | Sharpe | B22F 3/18 |
| | | | 266/78 |

* cited by examiner

HEATING FURNACE SYSTEM FOR HOT STAMPING

CLAIM OF PRIORITY

This application claims the priority of Korean Patent Application No. 10-2008-0096912, filed on Oct. 2, 2008, in the Korean Intellectual Property Office, the disclosure of which is incorporated herein by reference.

BACKGROUND OF THE INVENTION

Field of the Invention

The present invention relates to a hybrid heating furnace system for hot stamping, in which a high-frequency heating furnace is combined with an electric furnace (or a gas furnace).

Description of the Related Art

In vehicle manufacturing fields, there has been a focus on a decrease in weight and an increase in strength. Recently, hot stamping technology has been located at the center of this focus. The hot stamping technology was proposed by Norrbottens Jarnverk AB in Sweden in the early 1970s. In GB Patent No. 1490535 issued to this company, the hot stamping technology is disclosed in detail.

Referring to FIG. 1, the hot stamping technology is characterized by manufacturing a steel plate part 1b having high strength of 1500 MPa by heating a steel plate 1 in a heating furnace 10 at high temperature of $A_{c3}$ or more, and forming and heat-treating the heated steel plate in a press 20. This hot stamping process is called hot forming, hot pressing, or the like. As a material for the hot stamping, a so-called boron steel is used which contains carbon of about 0.2 wt % and uses manganese (Mn) and boron (B) as elements for improving heat treatment performance.

This hot stamping technology has advantages in that it simultaneously carries out formation and heat treatment to thereby provide excellent productivity, in that it forms a steel plate at high temperature to thereby improve formability and dimensional precision, and in that it remarkably reduces spring-back or delayed fracture that becomes an issue, particularly, in high-strength parts. In contrast, the hot stamping technology has disadvantages in that it cannot avoid surface oxidation of the steel plate due to a high-temperature process, and that it must perform a separate descaling process 30 on formed products as illustrated in FIG. 1. In order to remove this descaling process, there has been a proposal for aluminized steel sheets, etc. which are available from Arcelor or Nippon Steel.

Meanwhile, in terms of application of the hot stamping technology, heating furnaces that have mainly been used for a long time are electric furnaces. The steel plate for the hot stamping must be completely austenitized by heating at a temperature between 880° C. and 950° C. above $A_{c3}$. For the austenitization, the steel plate, being 1.2 mm thick, requires between 12 minutes and 17 minutes when the electric furnace is used. In this manner, the heating furnaces such as electric furnaces or gas furnaces increase heating time, and thus cause a decrease in process speed and an increase in production cost. Furthermore, the heating furnaces have a considerable length ranging from 23 m to 30 m, and thus have no choice but to have a huge volume. These large facilities increase various expenses.

Currently, high-frequency induction heating is used for local strengthening of body parts such as center pillars. This high-frequency induction heating can heat the steel plate to a temperature of 1000° C. or more within several seconds. As such, in the case where high-frequency induction heating is applied to hot stamping technology, this can make the heating furnaces small, and reduce heating time and cost of the steel plate. However, in the case of the heating furnace based on the high-frequency induction heating (hereinafter, referred to as "high-frequency furnace"), the heating furnace has a problem of a sharp increase in temperature or deformation during transferring the steel plate. For this reason, the heating furnace has been merely used for heat treatment of somewhat thick parts rather than thin parts.

SUMMARY OF THE INVENTION

An aspect of the present invention is to provide a hybrid heating furnace system for hot stamping, in which a high-frequency heating furnace is combined with an electric furnace (or a gas furnace) in order to make facilities small and improve productivity.

According to an aspect of the present invention, there is provided a heating furnace system for hot stamping, including a steel plate feed section; a first heating furnace having a plurality of pairs of upper and lower rolls arranged in a lengthwise direction thereof in order to transfer a steel plate, and high-frequency coils alternately arranged with the pairs of upper and lower rolls in the lengthwise direction thereof; a second heating furnace continuously transferring the steel plate from the first heating furnace during heating the steel plate at temperature of $A_{c3}$ or more, and having a plurality of transfer rollers arranged in a lengthwise direction thereof; and a discharge section discharging the steel plate from the second heating furnace.

Here, the first heating furnace may include at least two heating zones having different target temperatures. Each heating zone may have high-frequency coils connected to a separate inverter.

Further, the high-frequency coils may be each installed between the upper rolls adjacent to each other and between the lower rolls adjacent to each other.

The pairs of upper and lower rolls may be hollow, and be made of ceramic material.

Further, the pairs of upper and lower rolls may have extensions inserted into opposite ends thereof in order to lengthen the rolls and to make connection to drives, and yarns wound on outer circumferences of the rolls into which the extensions are inserted. The yarns may be impregnated with resin.

The discharge section may include rotation rolls installed for introducing the steel plate, and stoppers installed upwards between the rotation rolls adjacent to each other in order to fix a position of the introduced steel plate.

According to an aspect of the present invention, there is provided a heating furnace system for hot stamping, including: a steel plate feed section; a first heating furnace having at least two heating zones with different target temperatures, each heating zone having high-frequency coils connected to a separate inverter; a second heating furnace at least having heating sections and a standby section, heating a steel plate transferred from the first heating furnace at temperature of $A_{c3}$ or more in the heating sections, and controlling a transferring speed of the steel plate in the standby section independently of that in the heating section; and a discharge section discharging the steel plate from the second heating furnace.

Here, the first heating furnace may include a plurality of pairs of upper and lower rolls arranged in a lengthwise direction thereof in order to transfer the steel plate, and the high-frequency coils alternately installed with the pairs of upper and lower rolls in the lengthwise direction thereof.

Further, the standby section may include position and temperature detection sensors for the steel plate.

Further, the transferring speed of the steel plate before the steel plate is discharged from the standby section may be equal to those in the heating sections. The transferring speed of the steel plate may be increased when the steel plate completely enters the standby section and is discharged from the standby section.

The transferring speed of the steel plate after the steel plate is discharged from the standby section may be gradually reduced to be equal to those in the heating sections.

The second heating furnace may include one of an electric furnace and a gas furnace.

According to embodiments of the present invention, the heating furnace system for hot stamping can reduce space required for facilities by 50% or more compared to the related art, fuel cost due to a decrease in the length of an electric furnace, and the unit cost of a hot stamped part.

Further, the heating furnace system can not only properly adjust outputs of inverters in the first heating furnace to gradually increase temperature of a steel plate, but can also prevent deformation caused by sharp heating of the steel plate due to use of a plurality of pairs of upper and lower rolls, and minimize deformation during the transfer of the steel plate.

In addition, high-frequency coils are alternately installed with pairs of upper and lower rolls, so that they can perform direct induction heating on the steel plate. During high-frequency heating, it is possible to minimize a high-frequency influence on other parts than the steel plate.

BRIEF DESCRIPTION OF THE DRAWINGS

The above and other objects, features and advantages of the present invention will become more apparent to those of ordinary skill in the art by describing in detail exemplary embodiments thereof with reference to the attached drawings in which.

DETAILED DESCRIPTION OF THE EXEMPLARY EMBODIMENTS

A heating furnace system for hot stamping according to an exemplary embodiment of the present invention will be described below with reference to the accompanying drawings.

Figure 1:
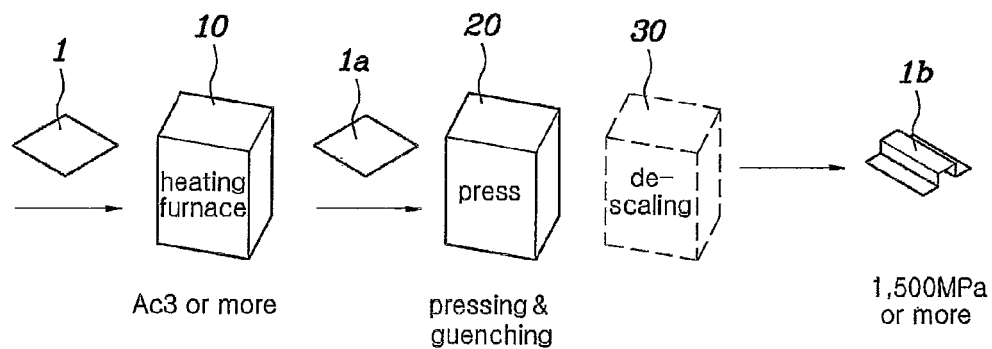
FIG. 1 is a diagram for explaining a typical hot stamping process.
Figure 2:
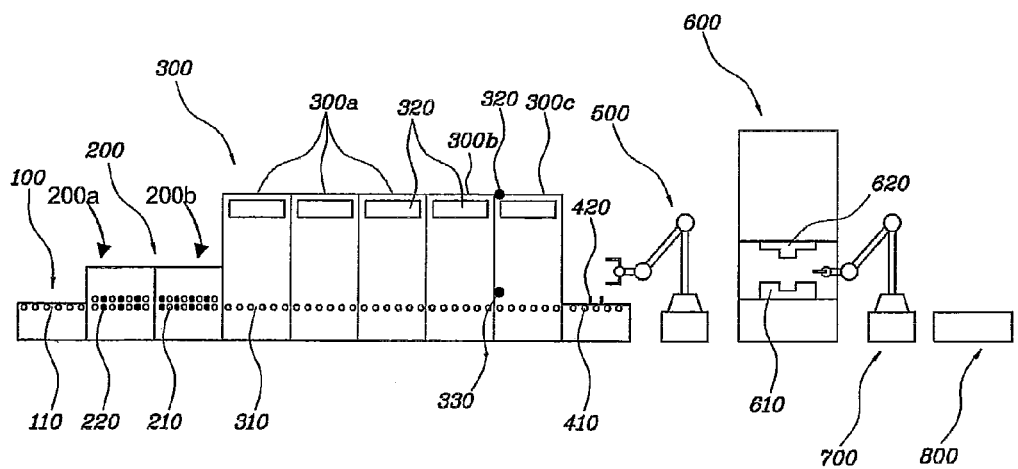
FIG. 2 illustrates a heating furnace system for hot stamping according to an embodiment of the present invention along with a press.

Referring to FIG. 2, a hot stamping process comprises heating a steel plate in a heating furnace system, forming and cooling the heated steel plate in a press 600, and loading the pressed steel plate onto a conveyor 800. Transfer robots 500 and 700 are positioned to transfer the steel plate (or a product) between the heating furnace system and the press 600, and between the press 600 and the conveyor 800, respectively.

The heating furnace system includes a steel plate feed section 100, heating furnaces 200 and 300, and a discharge section 400. The heating furnaces 200 and 300 are sorted into a first heating furnace 200 and a second heating furnace 300.

As illustrated in FIG. 2, the steel plate feed section 100 includes a plurality of feed rolls 110 arranged in a lengthwise direction in order to feed the steel plate to the first heating furnace 200. A length of the steel plate feed section 100 can be adjusted according to a size of the steel plate to be fed, and as needed. As the feed rolls 110, stainless rolls are used.

Figure 3:
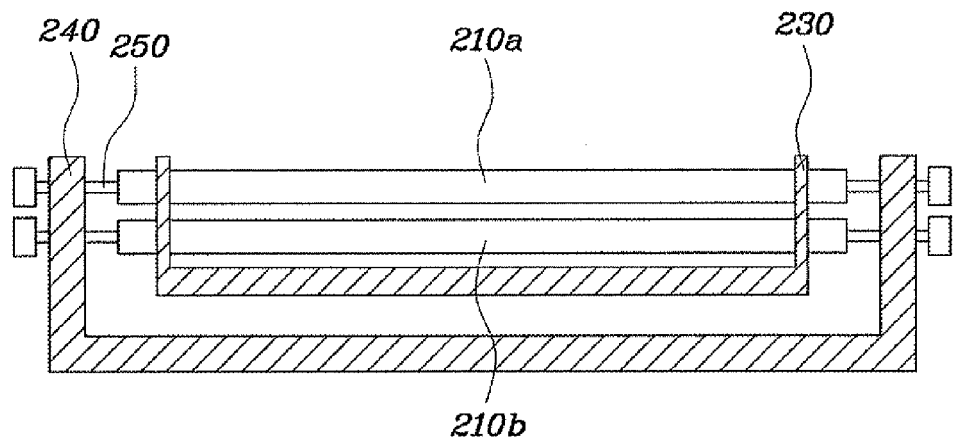
FIG. 3 illustrates pairs of upper and lower rolls of the first heating furnace shown in FIG. 2.
Figure 4:
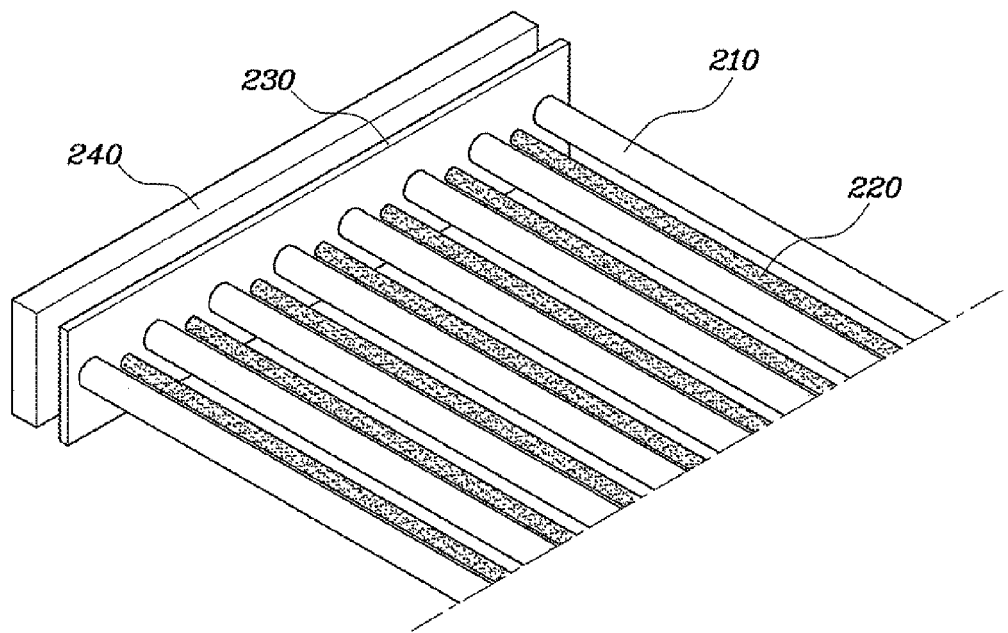
FIG. 4 illustrates the pairs of upper and lower rolls shown in FIG. 3 when viewed from the top.

As illustrated in FIGS. 2 through 4, the first heating furnace 200 is a high-frequency furnace using high-frequency induction heating in order to heat the steel plate, and has two heating zones 200a and 200b having different target temperatures. Each heating zone is provided with high-frequency coils 220 connected to a separate inverter (not shown). The target temperatures are obtained through adjustment of output of the inverter, particularly through frequency modulation. The target temperature for heating the steel plate on the first heating zone 200a has a range between 25° C. and 450° C. (using a relatively low frequency), while the target temperature for heating the steel plate on the second heating zone 200b has a range between 450° C. and 750° C. (using a relatively high frequency). In this manner, the two heating zones are divided to increase temperature of the steel plate, so that it is possible to prevent deformation or twist of the steel plate caused by a sharp increase in temperature.

Figure 5:
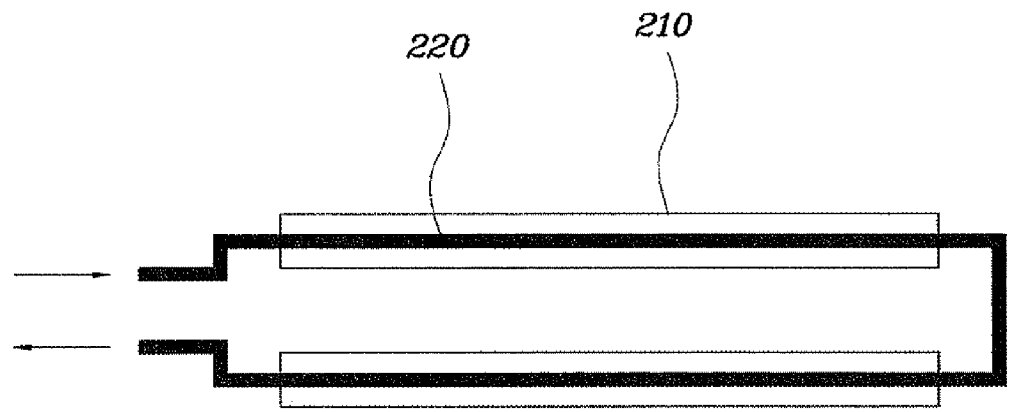
FIG. 5 is a diagram for explaining the arrangement between the pairs of upper and lower rolls shown in FIG. 4 and high-frequency coils.

Meanwhile, in the first heating furnace 200, a plurality of pairs of upper and lower rolls 210 for transferring the steel plate are arranged in a lengthwise direction of the first heating furnace, and the high-frequency coils 220 are alternately arranged with the pairs of upper and lower rolls 210 in the lengthwise direction of the first heating furnace. Referring to FIGS. 4 and 5, each high-frequency coil 220 is installed in a structure where it sequentially runs between the neighboring upper rolls 210a, between the pairs of upper and lower rolls 210, and between the neighboring lower rolls 210b, i.e. is bent in a quadrilateral shape (see FIG. 5). The steel plate passing between the upper rolls 210a and the lower rolls 210b is almost continuously heated by the high-frequency coils installed in spaces between the rolls. Thus, the deformation or twist of the steel plate which may occur during heating can be effectively controlled by adjusting an interval between the upper roll 210a and the lower roll 210b. The high-frequency coils 220 are insulated and coated such that no spark occurs when coming into contact with the steel plate.

The speed at which the steel plated is transferred at the first heating furnace 200 is adjusted within a range from 70 mm/sec to 90 mm/sec. Referring to FIGS. 3 through 5, opposite ends of the upper and lower pairs 210 pass through Hemmit panels 230 for thermal insulation, and then are mounted on Bakelite panels 240 defining a case of the first heating furnace 200. The Bakelite panels 240 are used to shield an influence of high frequency as well as maintain an insulating characteristic and strength. The opposite ends of the upper and lower pairs 210 passing through these Bakelite panels 240 are connected with drives (not shown), such as sprockets or bearings, for rotating the upper and lower pairs 210 by a typical technique. Meanwhile, the drive, particularly the bearing, to which the upper roll 210a is connected, may be provided with a damper there outside so as to be able to absorb impact to which the steel plate applies to the upper roll 210a while passing between the upper roll 210a and the lower roll 210b.

Figure 6:
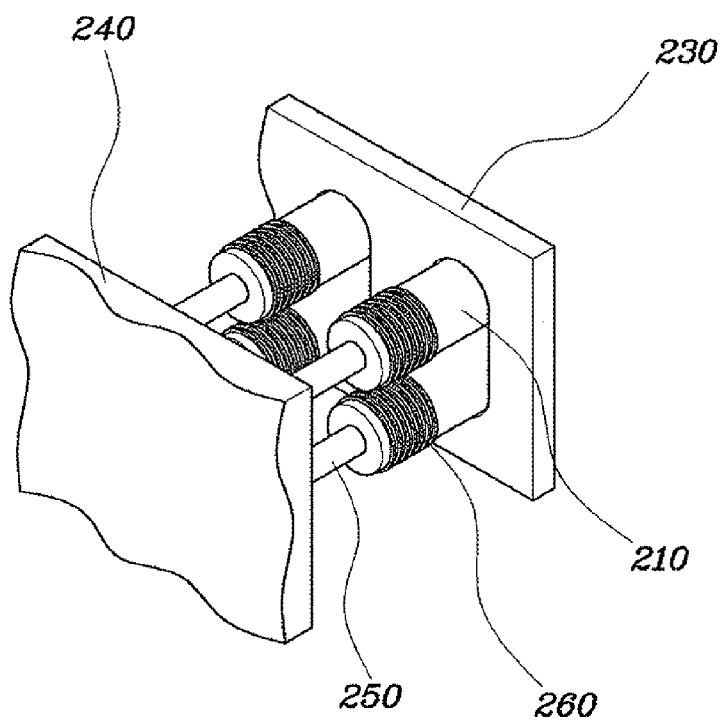
FIG. 6 illustrates a coupling structure of ends of the pairs of upper and lower rolls shown in FIG. 3.
Figure 7:
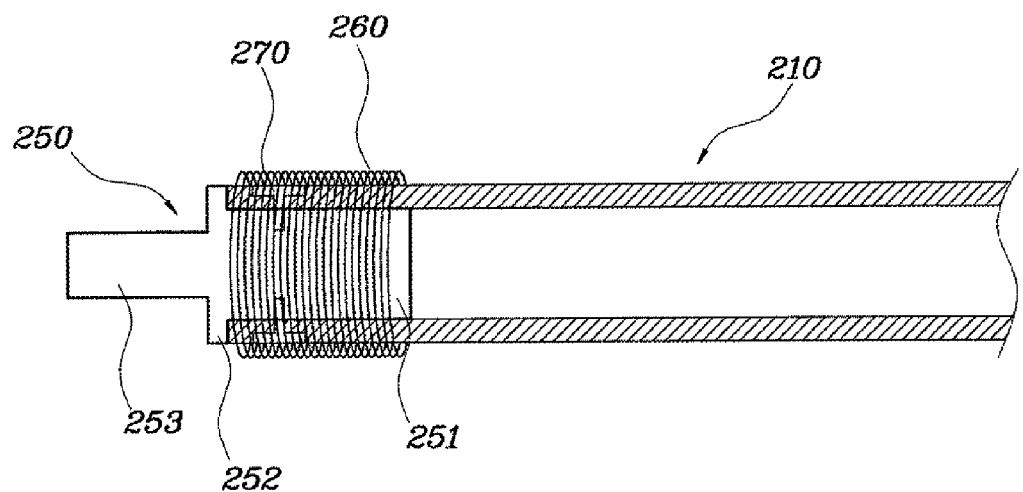
FIG. 7 is a cross-sectional view illustrating the pairs of upper and lower rolls shown in FIG. 6.
Figure 8:
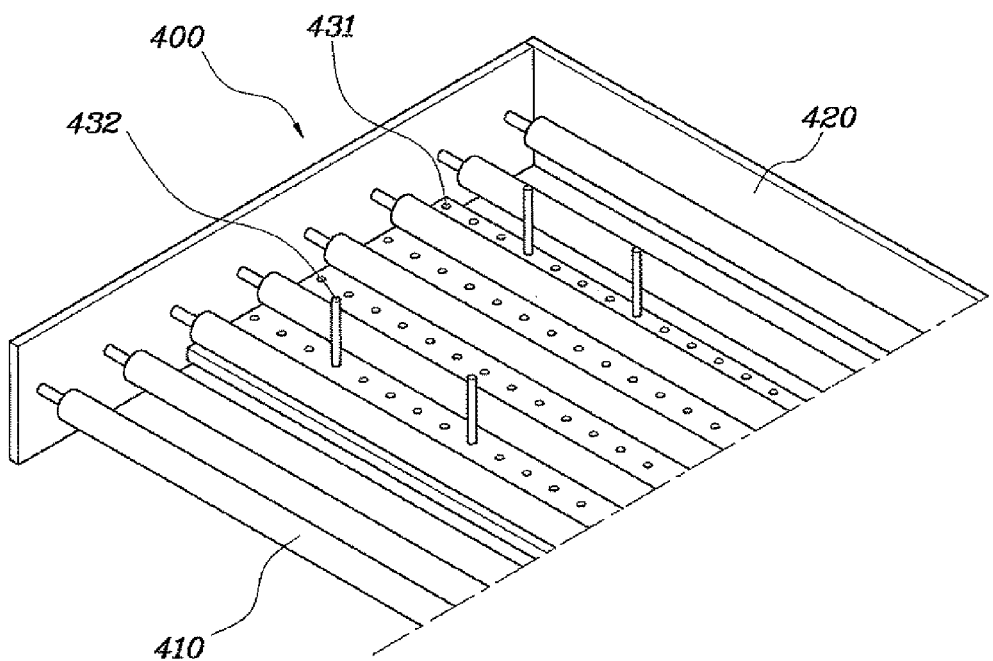
FIG. 8 illustrates the discharge section shown in FIG. 2.
Figure 9:
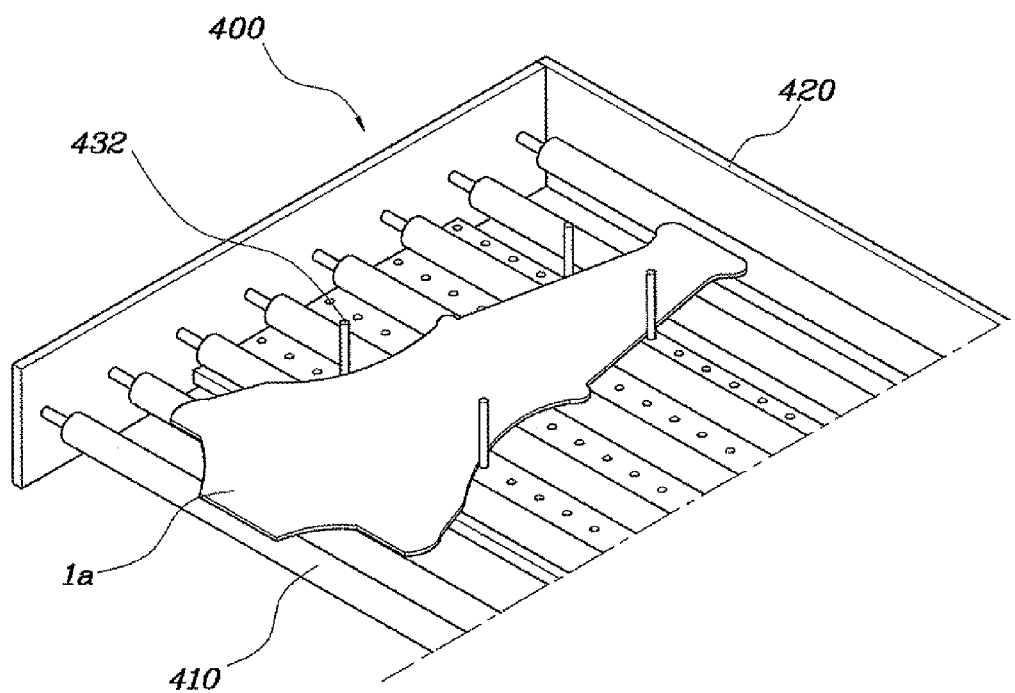
FIG. 9 illustrates the state where a steel plate introduced into the discharge section shown in FIG. 8 is held by stoppers.

The upper and lower rolls 210 are made of a hollow ceramic material for the insulating characteristic. As illustrated in FIGS. 6 and 7, extensions 250 are inserted into the opposite ends of the upper and lower rolls 210 in order to lengthen the rolls and to make connection to the drives. Yarn 260 is wound on the outer circumference of each roll into which the extension is inserted within a predetermined area. The reason of winding the yarn 260 is to prevent the hollow ceramic rolls vulnerable to impact from being broken by misalignment between central axes of the extensions 250 inserted into the opposite ends of each roll 210 and a central axis of each roll 210. This wound yarn 260 is impregnated with epoxy resin, thereby increasing strength. As illustrated in FIGS. 6 and 7, each extension 250 includes an insertion part 215 inserted into the roll 210, a step 252 fitted to the roll 210, and an extension part 253 having a smaller diameter than the insertion part 251. The insertion part 251 of the extension 250 is fastened with the roll 210 by bolts 270.

The second heating furnace 300 includes an electric furnace or a gas furnace for heating the steel plate transferred from the first heating furnace 200 at temperature of $A_{c3}$ or more (about 950° C. or more). As illustrated in FIG. 2, the second heating furnace 300 has five heating zones, and the first heating furnace 200 has two heating zones, so that the inventive heating furnace system has a total of seven heating zones. If the five heating zones of the second heating furnace 300 are called third to seventh heating zones, the third to fifth heating zones are heating sections 300a for heating the steel plate transferred from the first heating furnace 200 at temperature of $A_{c3}$ or more, the sixth heating zone is a soaking section 300b, and the seventh heating zone is a standby section 300c. A reference numeral 320 indicates a heater.

As illustrated in FIG. 2, a plurality of transfer rollers 310 made of heat resisting steel are arranged throughout the entire length of the second heating furnace 300. A steel plate position detection sensor 320 and a temperature detection sensor 330 are installed in the standby section 300c. These sensors 320 and 330 detect whether or not the steel plate enters the standby section 300c (i.e. whether or not the steel plate is placed on the transfer rollers of the standby section 300c throughout the entire length thereof), and whether or not the steel plate is sufficiently soaked at a discharge temperature of $A_{c3}$ or more. When these conditions are met, the steel plate begins to be discharged from the standby section 300c to the discharge section 400.

The transferring speed of the steel plate in the heating section 300a is equal to that in the soaking section 300b. The transferring speed of the steel plate in the standby section 300b is also equal to those in the heating and soaking sections 300a and 300b until the steel plate is discharged. When the steel plate completely enters the standby section 300c and then is discharged (i.e. when it is determined on the basis of measured values of the position and temperature detection sensors that the steel plated can be discharged from the standby section, and thus the steel plate is actually discharged), the transferring speed of the steel plate is set so as to be increased. This is because, in the case where the steel plate is placed in the standby section 300c at a leading end thereof, and in the soaking section 300b at a trailing end thereof, and if the center of gravity of the steel plate is located at the trailing end of the steel plate, the transferring speed of the steel plate is dependent on the rotating speed of the transfer rollers of the soaking section 300b, although the rotating speed of the transfer rollers of the standby section 300c is increased. Further, in the case where the increased rotating speed of the transfer rollers 310 is sharply reduced, the transfer rollers 310 are overloaded to have a possibility of flexure or damage. As such, after the steel plate is discharged from the standby section 300c, the transferring speed thereof is set in such a manner that it is gradually reduced to be equal to those for the heating and soaking sections 300a and 300b. The temperature of the steel plate is sharply lowered for several seconds until the steel plate comes out of the standby section 300c and then is formed by the press 600. The second heating furnace 300 may be supplied with an atmosphere gas in order to prevent oxidation of the steel plate.

Figure 10:
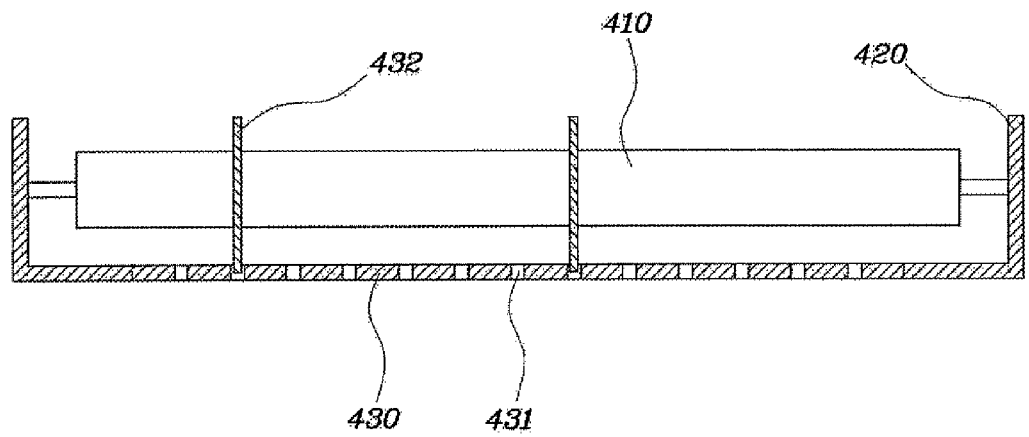
FIG. 10 illustrates a coupling structure of the stoppers shown in FIG. 8.

Referring to FIGS. 2, 7 through 10, the standby section 300c of the second heating furnace 300 is followed by the discharge section 400 having rotation rolls 410 for introduction of the steel plate. Stoppers 432 are installed upwards between the neighboring rotation rolls 410 in order to fix a position of the introduced steel plate. A support plate 430 is installed below the rotation rolls 410. The support plate 430 is formed with a plurality of mounting holes 431 in the axial direction of the rotation rolls 410. These mounting holes 431 are densely formed so as to be able to install the stoppers 432 at interference positions with the steel plate according to the shape of the heated steel plate. As illustrated in FIG. 10, the support plate 430 is connected to a frame 420 of the discharge section. Meanwhile, the rotation rolls 410 of the discharge section 400 continue to be rotated as long as the steel plate is placed thereon. This continuous rotation is for preventing local temperature reduction, deformation, etc. of the steel plate at the places where the steel plate is in contact with the rotation rolls 410.

As illustrated in FIG. 2, the steel plate, which is transferred to the discharge section 400, is placed between upper and lower dies 610 and 620 of the press by the first transfer robot 500, and then is formed and heat-treated. The upper and lower dies 610 and 620 are each provided with a cooling channel for radiating heat. The pressed and heat-treated product is discharged and loaded on the conveyor 800 by the second transfer robot 600, and then is transferred.

While the present invention has been shown and described in connection with the exemplary embodiment, it will be apparent to those skilled in the art that modifications and variations can be made without departing from the spirit and scope of the invention as defined by the appended claims.

What is claimed is:

1. A hybrid heating furnace system for hot stamping comprising:
   a steel plate feed section;
   a first heating furnace having at least two heating zones with different target temperatures, each heating zone having high-frequency coils connected to a separate inverter;
   a second heating furnace at least having heating sections and a standby section, wherein the heating sections heat a steel plate transferred from the first heating furnace to a temperature greater than or equal to the temperature at which ferrite in the steel plate is transformed to austenite, and wherein the standby section controls a transferring speed of the steel plate independently of that in the heating sections; and a discharge section disposed next to the second heating furnace to receive the steel plate transferred from the second heating furnace, wherein the heating sections and the standby section of the second heating furnace each include one of an electric resistance heater having heating elements disposed apart from the steel plate and a gas heater, wherein the discharge section includes rotation rolls installed for introducing the steel plate, and stoppers installed upwards between the rotation rolls adjacent to each other in order to fix a position of the introduced steel plate, and wherein the rotation rolls of the discharge section are configured to be continuously rotated as long as the steel plate is placed thereon, such that the continuous rotation prevents local temperature reduction and deformation of the steel plate at places where the steel plate is in contact with the rotation rolls.

2. The hybrid heating furnace system of claim 1, wherein the first heating furnace includes a plurality of pairs of upper and lower rolls arranged in a lengthwise direction thereof in order to transfer the steel plate, and the high-frequency coils alternately installed with the pairs of upper and lower rolls in the lengthwise direction thereof.

3. The hybrid heating furnace system of claim 1, wherein the standby section includes position and temperature detection sensors for the steel plate.

4. The hybrid heating furnace system of claim 1, wherein the transferring speed of the steel plate before the steel plate is discharged from the standby section is equal to those in the heating sections, and the transferring speed of the steel plate is increased when the steel plate completely enters the standby section and is discharged from the standby section.

5. The hybrid heating furnace system of claim 1, wherein the transferring speed of the steel plate after the steel plate is discharged from the standby section is gradually reduced to be equal to those in the heating sections.

* * * * *